(12) United States Patent
Noda et al.

(10) Patent No.: US 11,041,872 B2
(45) Date of Patent: Jun. 22, 2021

(54) AUTOMATIC ANALYSIS DEVICE

(71) Applicant: Hitachi High-Tech Corporation, Tokyo (JP)

(72) Inventors: Kazuhiro Noda, Tokyo (JP); Tatsuya Fukugaki, Tokyo (JP); Takahiro Kumagai, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 249 days.

(21) Appl. No.: 16/086,844

(22) PCT Filed: Jan. 30, 2017

(86) PCT No.: PCT/JP2017/003086
§ 371 (c)(1),
(2) Date: Sep. 20, 2018

(87) PCT Pub. No.: WO2017/163607
PCT Pub. Date: Sep. 28, 2017

(65) Prior Publication Data
US 2019/0094250 A1   Mar. 28, 2019

(30) Foreign Application Priority Data
Mar. 23, 2016 (JP) .............................. JP2016-057821

(51) Int. Cl.
*G01N 35/04* (2006.01)
*G01N 35/02* (2006.01)
*G01N 35/00* (2006.01)

(52) U.S. Cl.
CPC .............. *G01N 35/04* (2013.01); *G01N 35/02* (2013.01); *G01N 2035/00277* (2013.01); *G01N 2035/0417* (2013.01); *G01N 2035/0434* (2013.01)

(58) Field of Classification Search
CPC ....................................................... B01L 9/543
See application file for complete search history.

(56) References Cited

U.S. PATENT DOCUMENTS

| 5,948,362 A * | 9/1999 | Steinbrenner ........... B01L 9/543 422/526 |
| 7,360,984 B1 * | 4/2008 | Sugiyama ............... B01L 9/543 414/798.1 |

(Continued)

FOREIGN PATENT DOCUMENTS

| CN | 104020309 A | 9/2014 |
| CN | 104108603 A | 10/2014 |

(Continued)

OTHER PUBLICATIONS

International Search Report (PCT/ISA/210) issued in PCT Application No. PCT/JP2017/003086 dated May 16, 2017 with English translation (four (4) pages).

(Continued)

*Primary Examiner* — Matthew D Krcha
(74) *Attorney, Agent, or Firm* — Crowell & Moring LLP

(57) ABSTRACT

The present invention provides an automatic analysis device and an automatic specimen processing system having a component-rack supply mechanism that, in a state where a plurality of component racks each having a disposable component mounted thereon are stacked, separates only a component rack at the leading stage of the stack from the other component racks, and supplies the separated component rack to the automatic analysis device or the automatic specimen processing system. Specifically, the automatic analysis device and the automatic specimen processing system have a supply mechanism including a separation mechanism that, in a state where a plurality of component racks are stacked, separates only a component rack at the leading stage of the stack from the other component racks, (Continued)

where the separation mechanism includes a movable mechanism having a pair of downward-movement prevention members that can separate the leading stage from the second stage of the stacked component racks; and a correction mechanism having a pair of correction members that correct a positional deviation of the component racks in order to avoid an influence of the positional deviation of the stacked component racks.

7 Claims, 9 Drawing Sheets

(56) References Cited

U.S. PATENT DOCUMENTS

| | | |
|---|---|---|
| 2008/0028835 A1 | 2/2008 | Higuchi |
| 2015/0017078 A1 | 1/2015 | Fattinger et al. |

FOREIGN PATENT DOCUMENTS

| | | |
|---|---|---|
| JP | 2005-249649 A | 9/2005 |
| JP | 2005-249650 A | 9/2005 |
| JP | 4454904 B2 | 4/2010 |
| JP | 2015-51131 A | 4/2015 |
| WO | WO 01/69263 A1 | 9/2001 |

OTHER PUBLICATIONS

Japanese-language Written Opinion (PCT/ISA/237) issued in PCT Application No. PCT/JP2017/003086 dated May 16, 2017 (three (3) pages).

* cited by examiner

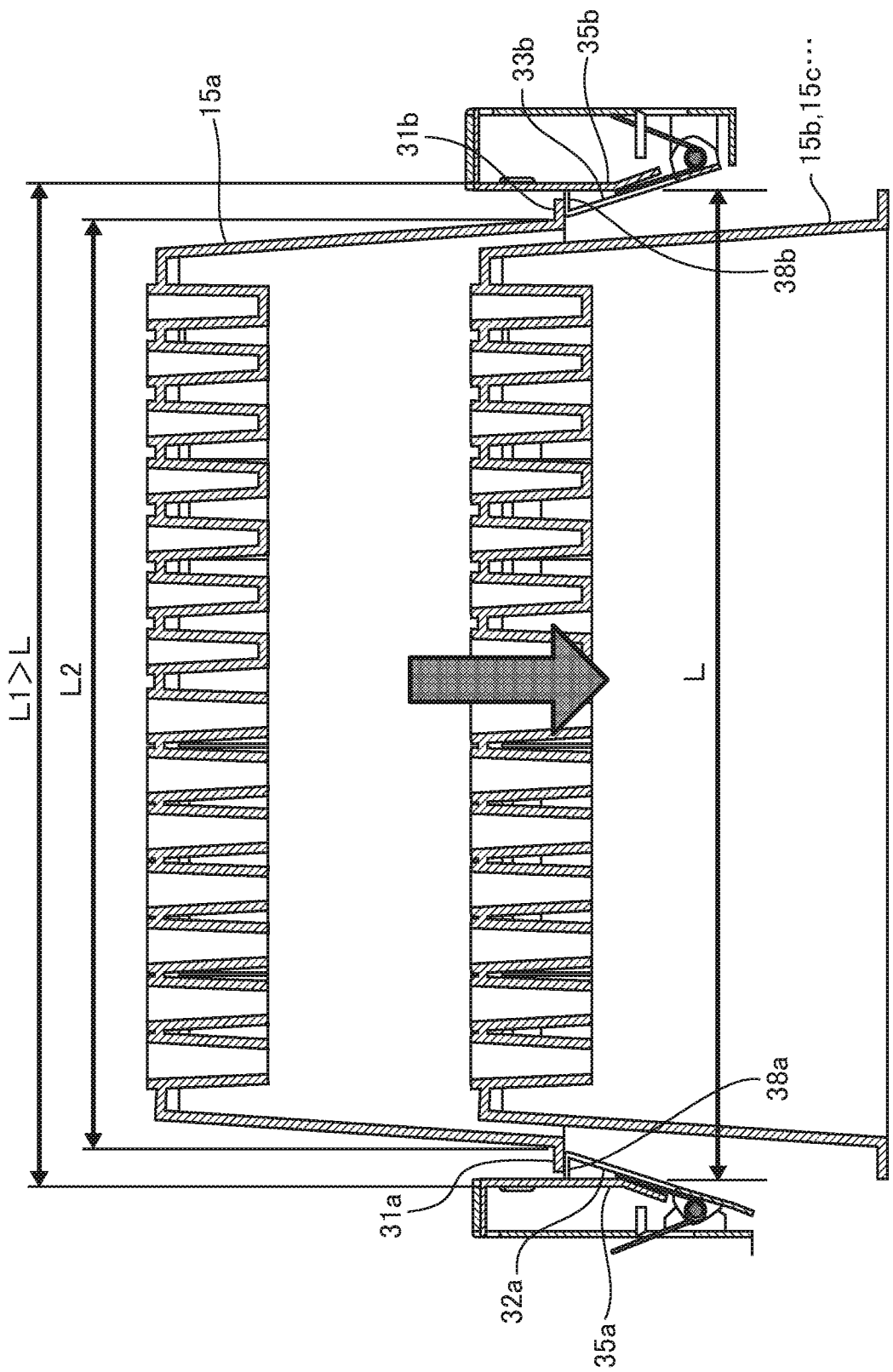

AUTOMATIC ANALYSIS DEVICE

TECHNICAL FIELD

The present invention relates to an automatic analysis device used for chemical analysis such as biochemical analysis or immunological analysis in clinical tests, or the like, and to a specimen processing system that automatically processes specimens such as blood, urine or the like when the specimens are tested in a laboratory.

BACKGROUND ART

For the purpose of prevention of contamination between samples, a disposable component (hereinafter referred as a "consumable item") may be used for a nozzle tip making contact with a sample, a reaction container and the like.

Patent Literature 1 discloses an automatic analysis device that uses disposable components such as a nozzle tip, a reaction container and/or the like to perform assays on samples, in which supply of an unused component rack supplying unused components and collection of a used component rack can be provided by a compact hardware configuration. Specifically, component racks holding unused components are moved upward from a maximum lowered position to a rack separation station by a supply elevator, and only the component rack at the uppermost stage of the stacked component rack is separated to stay on the rack separation station. The component rack thus separated is moved to a component retrieval station where the components on the component rack are removed one after another by a movable grasping unit. After the component has been consumed, the floor of the component take-out state is opened to drop the used component rack onto an elevator platform of a collection elevator for collection.

CITATION LIST

Patent Literature

Patent Literature 1: Japanese Patent No. 4454904

SUMMARY OF INVENTION

Technical Problem

In the component-rack supply mechanism disclosed in Patent Literature 1, only the component rack located at the uppermost stage is separated from the remaining component racks by the separation mechanism having claws to grip a part of the consumable-item rack. However, if the component racks are stacked up in too many stages, a column of the stacked component racks may tilt relative to the stacking direction, a positional deviation possibly occurs. Further, if the symmetry of the component-rack separation mechanism and the stacked component racks is not maintained, a positional deviation may also occur. Once a positional deviation occurs, the claws of the separation mechanism cannot laterally equally grip and hold the component rack, so that the uppermost component rack may possibly not be separated or may possibly fall, and in turn consumable items such as a nozzle tip, a reaction container and the like cannot be supplied to the device, leading to a risk of causing losses of specimen samples for use in analysis and specimen processing due to a delay or stop of analysis results.

Accordingly, it is an object of the present invention to provide an automatic specimen processing system and an automatic analysis device including a component-rack separation mechanism capable of separating only the uppermost component rack from the other component racks with stability to be supplied to an analysis unit without being affected by a positional deviation of the stacked component racks.

Solution to Problem

Features of the present invention in the light of the above problems will be described as follows. Specifically, an automatic analysis device, which is equipped with a consumable-item supply device to supply a consumable-item rack having an upper side on which consumable items are held and flanges provided in a lower place, includes: a platform that is capable of holding a plurality of the consumable-item racks in a state in which the consumable-item racks are stacked; a driving unit that moves, in a vertical direction, the platform holding the consumable-item racks in a horizontal position; a controller that controls operation of the driving unit; and a pair of separation mechanisms that are placed to be spaced at a certain distance apart in a horizontal direction, the pair of separation mechanisms separating an uppermost consumable-item rack from the consumable-item racks which are stacked, wherein each one of the pair of separation mechanisms has a support portion that is movable and abuts on the underside of one of the flanges to support a consumable rack, and a correction portion that is stationary and abuts on a side face of the flange to correct a position of the consumable-item rack.

Advantageous Effects of Invention

According to the present invention, it is possible to provide an automatic specimen processing system and an automatic analysis device including a component-rack separation mechanism capable of separating only the uppermost component rack from the other component racks with stability to be supplied to an analysis unit without being affected by a positional deviation of the stacked component racks. The above and other objects, features and advantageous effects will be more apparent from the following descriptions of embodiments in accordance with the present invention with reference to the accompanying drawings.

BRIEF DESCRIPTION OF DRAWINGS

FIG. 9 is a sectional view illustrating a state after separation of the uppermost component rack.

DESCRIPTION OF EMBODIMENTS

Embodiments in accordance with the present invention will now be described with reference to the drawings. Incidentally, the same signs are used throughout the figures to designate the same members, and a repetitive description is omitted appropriately.

The following description is given with reference to the drawings in accordance with embodiments to which the present invention is applied. A description is given using an example of use in an automatic analysis device as an embodiment. The automatic analysis device makes contact with samples to perform dispensing, and then advances the sample analysis manipulations using disposable components (hereinafter referred to as "consumable items") replaced for each sample. Use of a nozzle tip and a reaction container as consumable items is described in this example, but both the components are not necessarily used, one of them may be used. Also, any consumable item other than the nozzle tip and the reaction container may be configured to be used. The consumable items are two-dimensionally held on component racks, and set and supplied while the component racks are stacked on top of one another on an elevator platform.

Figure 1:
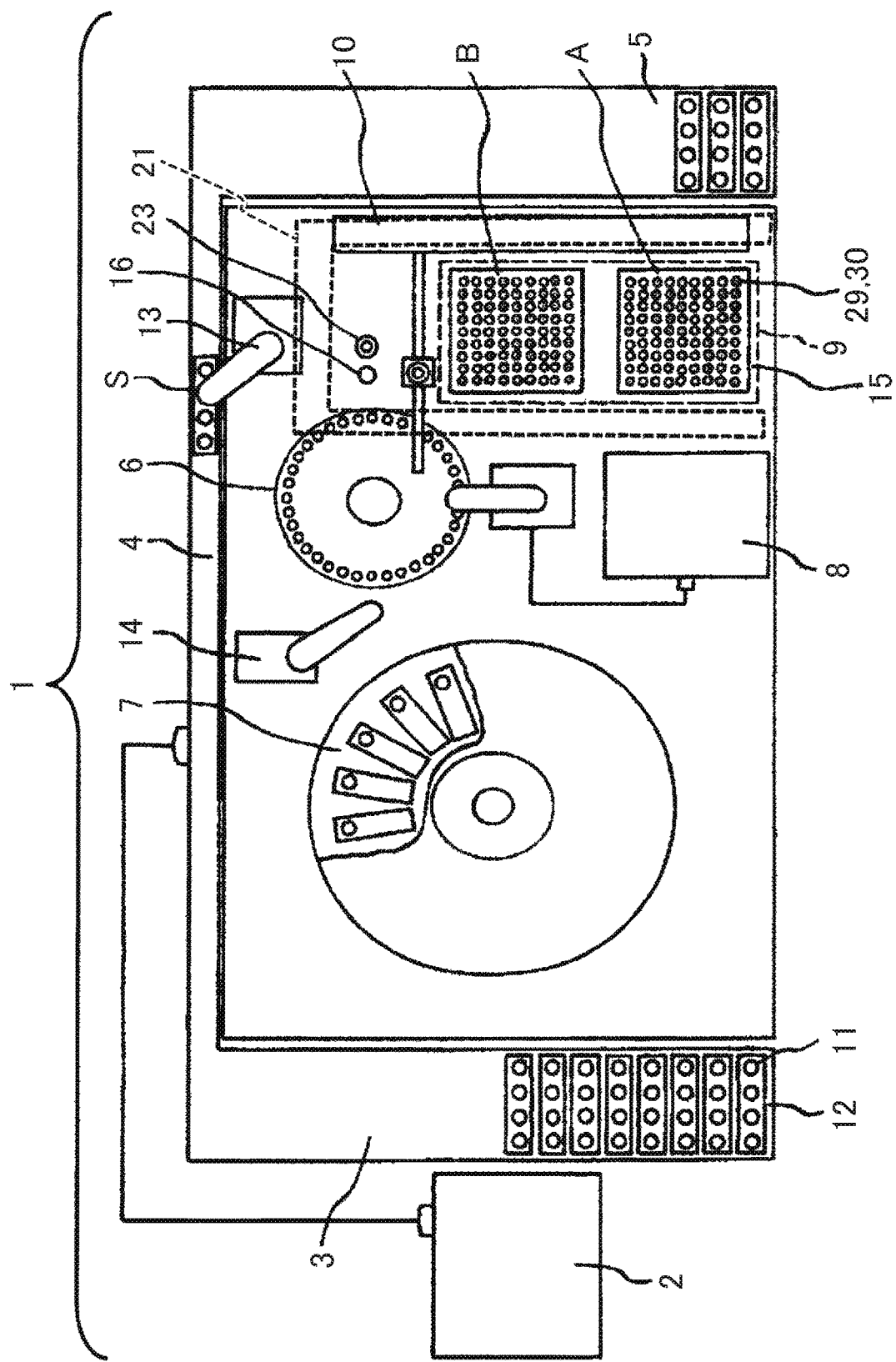
FIG. 1 is a top view illustrating each configuration in an automatic analysis device.

FIG. 1 is a diagram illustrating a top view of the automatic analysis device in accordance with the present invention. The automatic analysis device is an apparatus that is capable of using various reagents to process and measure biological samples such as blood plasma, blood serum, urine and the like, in order to obtain useful measurement information regarding a wide range of analysis items such as a biochemical analysis item, an immunological analysis item, a genetic analysis item and the like. For example, in an immunological analysis or the like, magnetic particles, a labeled antibody containing a labeled substance, and an antibody coupling the magnetic particles to an analyte are mixed into a sample including the analyte to cause an antigen-antibody reaction. Then, a resultant product with the analyte, the magnetic particles and the labeled substance being coupled together is captured by magnetic separation means, and then the captured resultant product is applied with a voltage to measure the amount of light emitted for quantification of the analyte. Also, in an automatic specimen processing system, the dispensing process is automatically performed on a biological sample, such as blood plasma, blood serum, urine or the like, of a specimen of each of patients brought together in a laboratory such that the biological sample is subdivided by a volume commensurate with test details, so that the efficiency of the steps of specimen process of arriving at the automatic analysis device is enabled.

Each constituent mechanism of the automatic analysis device 1 is operationally controlled by a controller 2. The automatic analysis device 1 has: a specimen-rack transfer system having a specimen entrance unit 3, a specimen transfer line 4 and a specimen storage unit 5; an analysis measurement system having a reaction disk 6, a reagent disk 7 and a measurement unit 8; and a consumable-item handling system having a consumable-item supply device 9 and a component transporter 10. A sample to be analyzed and measured is contained in a sample container 11, and a plurality of sample containers 11 is loaded on each specimen rack 12. A plurality of sample containers (or equivalently a single sample container) is held on a single specimen rack 12. The sample to be analyzed and measured by the automatic analysis device 1 is a biological sample such as blood plasma, blood serum, urine or the like. Information about a sample in the sample container 11 and request information about analysis items are pre-input through an input unit of the controller. Analysis conditions of each analysis item are stored in the controller 2.

A specimen identifying information medium such as a barcode is attached to an outer wall of each sample container 11, and a carrier identifying information medium such as a barcode is attached to each specimen rack 12. The above medium is not limited to a barcode, and may be, for example, a RFID tag, an IC chip or a two-dimensional barcode. The specimen rack 12 with the specimen container(s) loaded thereon is set in the specimen entrance unit 3 by a human operator. The specimen entrance unit 3 is connected at one time to the specimen transfer line 4, and ejects and delivers the specimen rack 12 toward the specimen transfer line on a step-by-step basis.

The specimen transfer line 4, which has received the specimen rack 12, transfers the specimen rack to a sample extraction position S. It is noted that the method for moving the specimen rack may include, but not limited to, driving a conveying belt, moving of a rack transferring arm or the like. Before being transferred to the sample extraction position, the carrier identifying information on each specimen rack and the specimen identifying information on each sample container are read by an identifying information reading instrument (not shown) such as a barcode reader, and the read information is communicated to the controller 2. The controller 2 controls, based on the read information, the operations of a specimen sampling mechanism 13, the reagent disk 7, a reagent dispensing mechanism 14, the reaction disk 6, the measurement unit 8 and the like. The specimen rack 12, which has undergone the sample extraction process at the sample extraction position S, is transferred to and stored in the specimen storage unit 5 by the specimen transfer line 4.

In the consumable-item handling system, the consumable-item supply device 9 supplies a nozzle tip 29 and a reaction container 30 used to avoid the carry over or contamination between samples. The consumable items are moved within the consumable-item supply device 9 while being held on a component rack 15 in two-dimensional (array) manner. The component transporter 10 catches and removes one of the consumable-item reaction containers from the component rack 15 located at a consumable-item retrieval mechanism section B, and then the component transporter 10 places it onto the reaction disk 6. Then, the component transporter 10 catches and removes one of the consumable-item nozzle tips from the same component rack, and then places it on a tip insertion position 16. A tip coupling nozzle of the specimen sampling mechanism 13 couples the nozzle tip at the tip insertion position 16. After that, the specimen sampling mechanism 13 performs the sample extraction operation.

The consumable-item supply device 9 includes a component-rack separation mechanism section A and the consumable-item retrieval mechanism section B. As described later, a supply elevator platform 17 for unused component racks 15 is placed under the component-rack separation mechanism section A. A collection elevator platform 18 for used component racks 15 is placed under the consumable-item retrieval mechanism section B.

Figure 2:
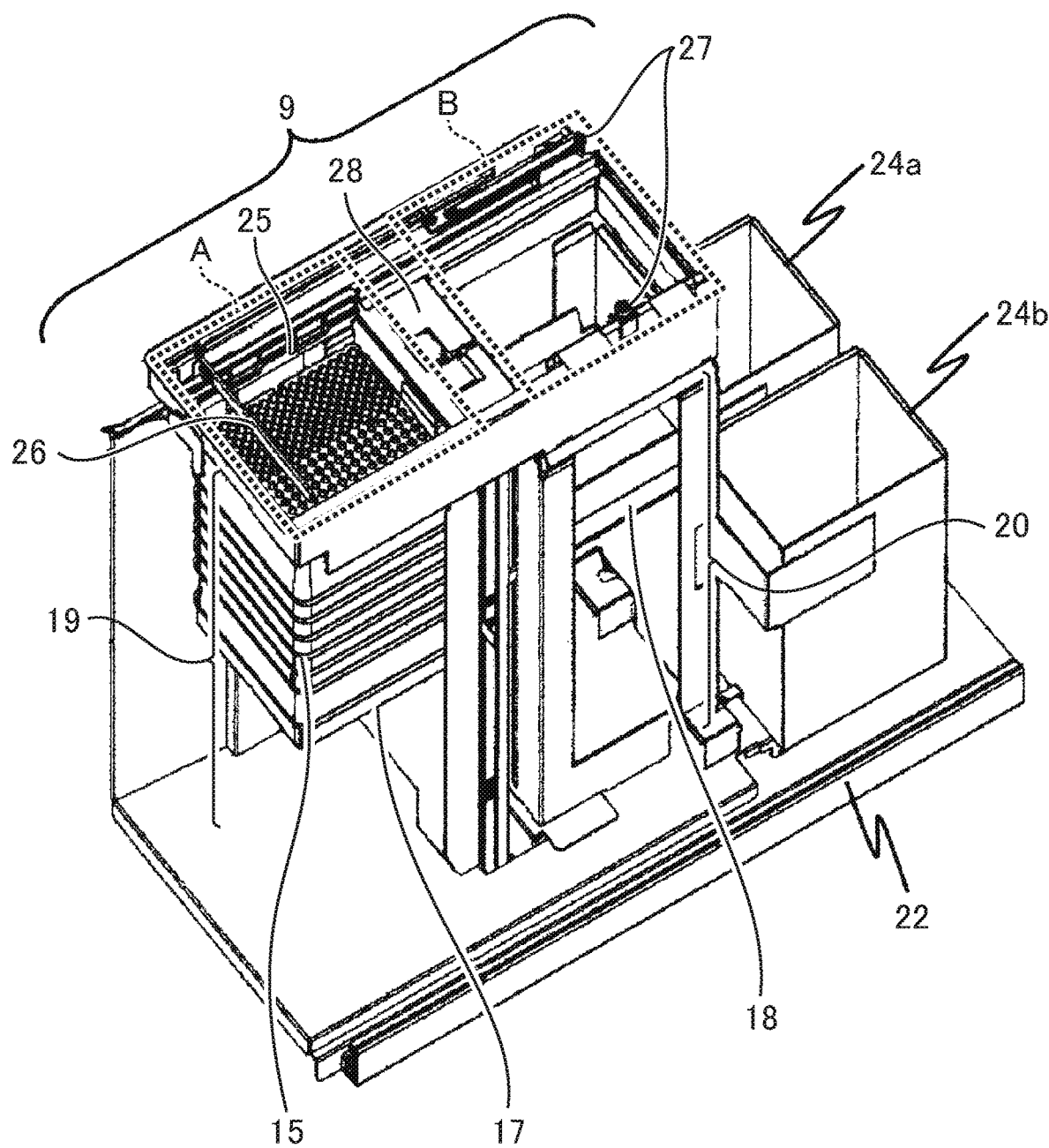
FIG. 2 is a perspective view illustrating each configuration in a consumable-item supply device placed in an elevator chamber.

The configuration of the consumable-item supply device 9 will now be described with reference to FIG. 2.

The consumable-item supply device 9 is equipped with the component-rack separation mechanism section A, the consumable-item retrieval mechanism section B and a component-rack disposal mechanism section. A supply elevator 19 is placed under the component-rack separation mechanism section A, and a collection elevator 20 is placed under the consumable-item retrieval mechanism section B. Both the elevators 19, 20 are housed in a rack elevator room 21 (see FIG. 1) of the consumable-item supply device 9. Further, the elevators are installed on a movable mount 22. Thereby, after pulling the mount 22 in its entirety out of the rack elevator room 21 (see FIG. 1) toward the front, the user can load a new component rack 15 onto the supply elevator platform 17, and further remove a used component rack 15 from the collection platform 18. At the back of the rack elevator room 21 (see FIG. 1), two removable waste component collection boxes 24a, 24b are placed to be located under a component disposal position 23 in FIG. 1. The mount 22 pulled out is pushed back into place, so that the elevators 19, 20 are maintained in places where the platforms can be raised/lowered as previously.

The component-rack separation mechanism section A located above the rack supply portion of the consumable-item supply device 9 includes a separation mechanism 25, a rack transfer device 26, a rack positioning device 27, a floor open/close device 28, and the like. Multiple component racks stacked up are moved upward toward the component-rack disposal mechanism section by the supply elevator 19, and the separation mechanism 25 separates and holds only the uppermost component rack 15 of the stacked, multiple component racks from the other component racks 15 such that the uppermost component rack 15 remains in the component-rack disposal mechanism section. The rack transfer device 26 moves the component rack 15, which has been located at the uppermost stage and separated from the other component racks by a descent of the elevator platform 17, from the component-rack separation mechanism section A toward the consumable-item retrieval mechanism section B. The rack positioning device 27 presses a plurality of portions of the component rack delivered to the consumable-item retrieval mechanism section B in order to effect positioning such that the pertinent component rack is maintained in position. The floor open/close device 28 opens a floor portion (a reclosable member) on which the component rack is placed in the consumable-item retrieval mechanism section B, when the collection elevator platform 18 receives the component rack from the component retrieval station, and after that the floor open/close device 28 closes the floor portion.

Figure 3:
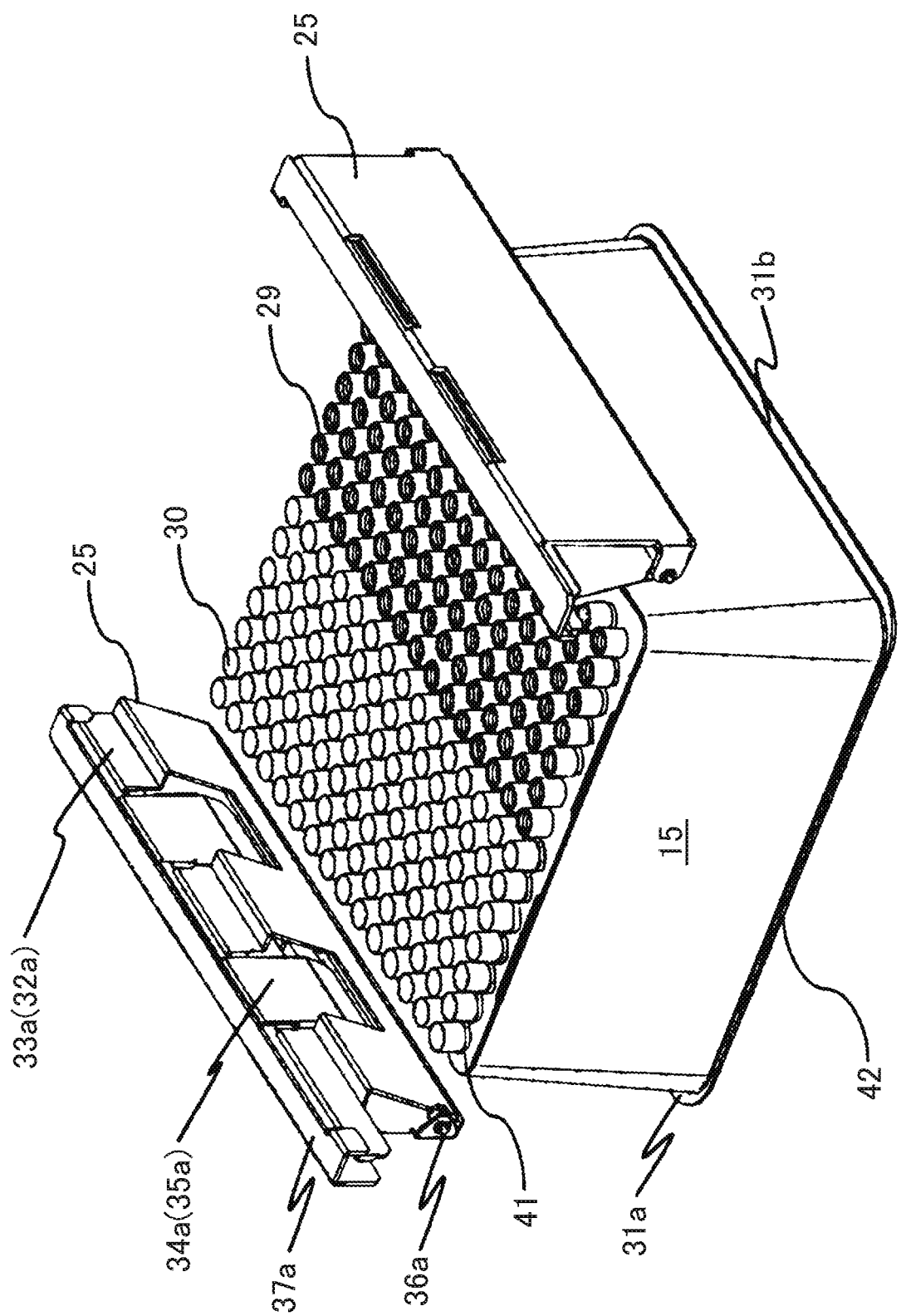
FIG. 3 is a perspective view illustrating the configuration of a component-rack separation mechanism section in accordance with the present invention.

The component rack and the configuration of the component-rack separation mechanism section A in the consumable-item supply device 9 will now be described with reference to FIG. 3.

The component-rack separation mechanism section A has a pair of the separation mechanisms 25 placed on the both sides of the component rack 15. The separation mechanisms 25 are bilaterally symmetrical and have both the sides similarly structured. The separation mechanisms 25 are intended for the separation between the uppermost component rack of the stacked component racks 15 and the second and subsequent component racks.

A side wall of the component rack 15 has an inclined surface tapering toward an upper edge 41 such that a lower edge 42 is formed to be longer than the upper edge 41 on which the components are placed, and the section is trapezoidal. The inside of the side walls is hollow and there is no bottom wall formed in a lower portion, so that the component rack 15 has a box shape by which the component racks 15 are easily stacked on top of one another.

The component rack 15 has the upper edges 41 forming an approximate quadrangle, and has two-dimensional array of holes capable of being loaded with a number of consumable items, each component which is a consumable item being inserted into each hole. The single component rack 15 in an embodiment can be loaded with a plurality of consumable-item nozzle tips 29 and a plurality of consumable-item reaction containers 30. In the instance illustrated in FIG. 3, the component rack 15 is loaded with the nozzle tips 29 and the reaction containers 30 in equal numbers.

Flanges 31a, 31b each having predetermined width and length formed respectively at lower ends of at least two opposite side walls of the component rack 15. A pair of the flanges 31a, 31b serves to facilitate separation between the component racks by being supported at the undersides by support portions 32a, 32b of the separation mechanisms 25 which will be described later. Further, if a positional deviation with respect to the stacking direction of the component racks 15 or a positional deviation due to the asymmetry between the separation mechanism and the component racks has occurred, the flanges 31a, 31b abut on correction portions 35a, 35b of the separation mechanism in order to serve to correct the positional deviation. In the embodiment, the flanges 31a, 31b each having a predetermined width and a predetermined length are used, but as long as the structure is to facilitate separation between the component racks by abutting on movable mechanisms 33a, 33b having downward-movement prevention members of the separation mechanisms which will be described later, any structure to abut on the downward-movement prevention for engagement, such as a hole or the like, may equally be used.

Figure 4:
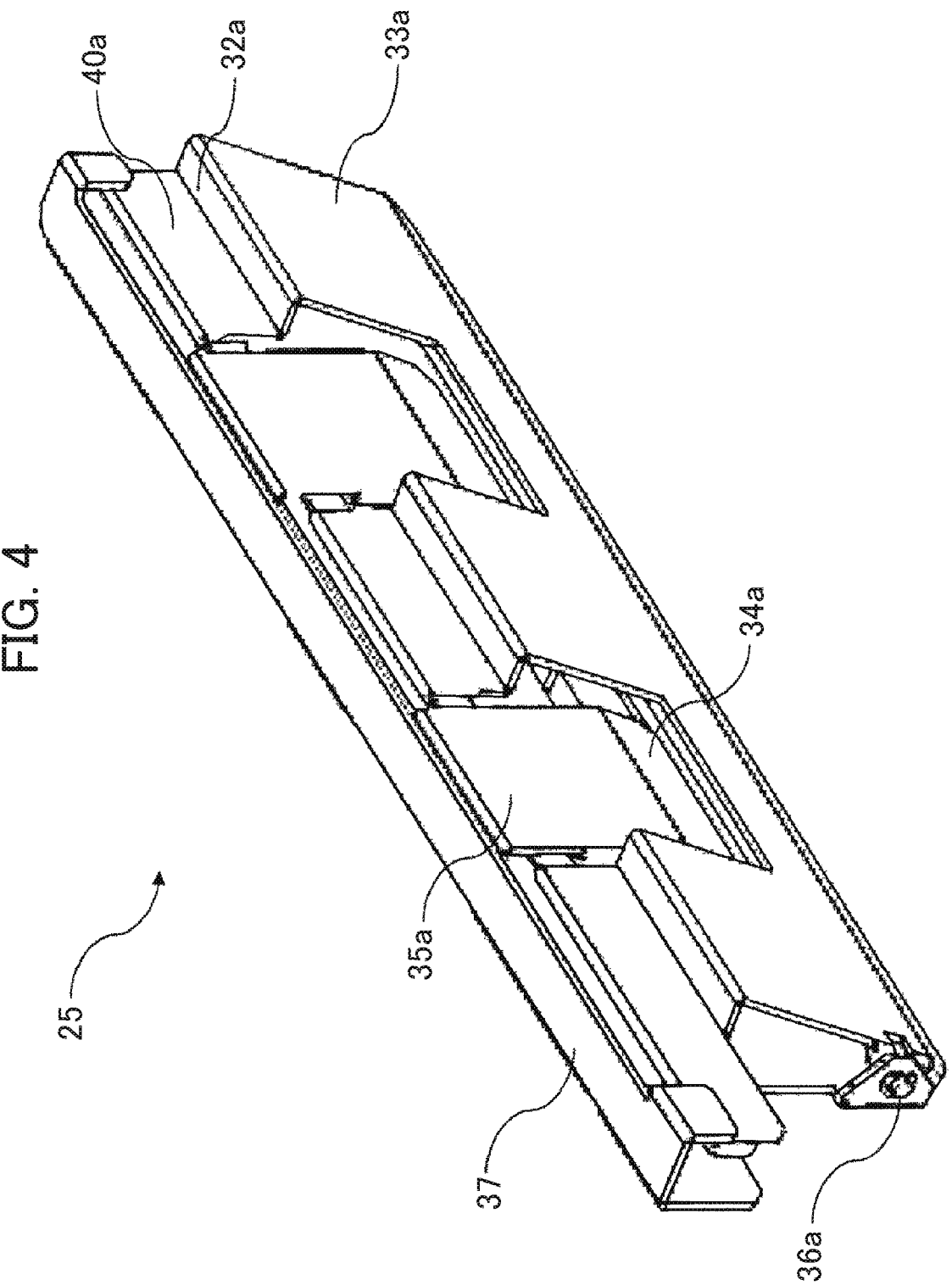
FIG. 4 is a perspective view illustrating the configuration of a separation mechanism in accordance with the present invention.
Figure 5A:
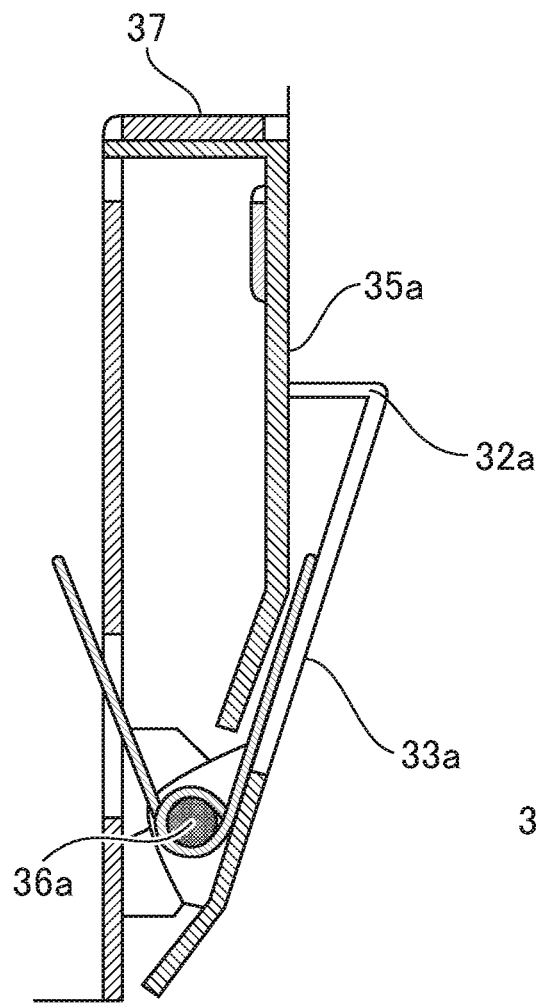
FIGS. 5A and 5B show sectional views describing the operation of the separation mechanism in accordance with the present invention.
Figure 5B:
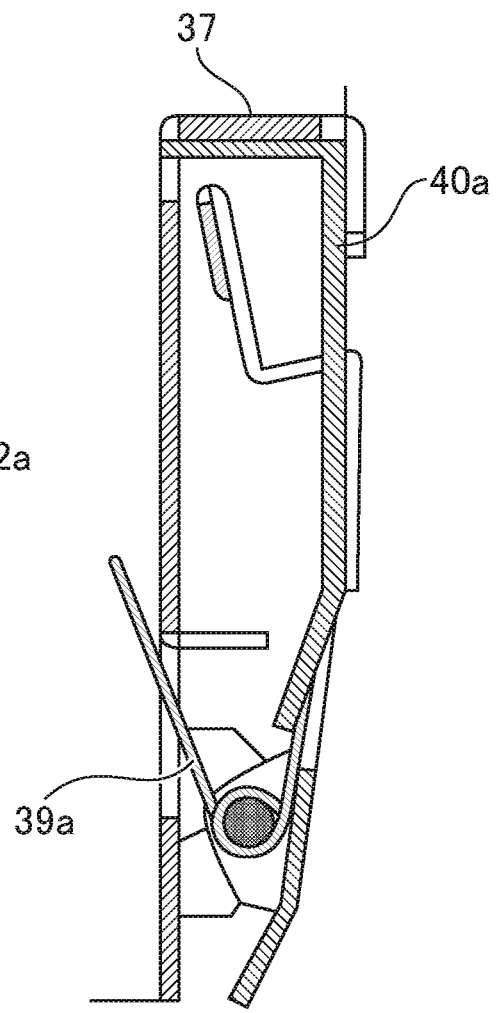

The configuration of the separation mechanism 25 in accordance with the present invention will now be described with reference to FIG. 4 and FIG. 5.

The separation mechanism 25 has the movable unit 33a and a correction mechanism 34a, in which the movable unit 33a has a pair of support portions (downward-movement prevention members) 32a which are spaced apart to fit the width of the component rack, and the correction mechanism 34a is intended for the correction for position of the component rack 15, and has a pair of correction portions (correction plates) 35a which are spaced apart to fit the width of the component rack. The movable mechanisms 33a and the correction mechanisms 34a are arranged in respective pairs in the direction along the flange 31a of the component rack 15, and in alternate position. It is noted that the movable mechanisms 33a and the correction mechanisms 34a may not necessarily be arranged in alternate position. For example, a movable mechanism 33a and a correction mechanism 34a may be arranged.

A pair of the movable mechanisms 33a having the support portions 32a is mounted on rotational shafts 36a such that the movable mechanisms 33a are parallel to each other in the lateral direction. The movable mechanism 33a has the support portion 32a and a stopper 40a which are formed by bending a relatively thin metal (e.g., stainless steel). Also, the movable mechanism 33a is more or less elasticity because it is formed of thin metal.

An elastic body 39a is, for example, a torsion spring, and is placed in contact with the movable mechanism 33a to press the movable mechanism 33a such that a pair of movable mechanisms 33a placed side by side projects toward the magazine. The stopper 40a comes into contact with a fixed end 37 or a plate piece secured to the fixed end 37 to lock the position of the movable mechanism 33a such that the top surface of the support portion 32a reaches an optimal position to hold the flange described later. Because of this, the movable mechanism 33a can rotate about the axis of the rotational shaft 36a by the fixed end 37 of the movable mechanism 33a and a movable end by the support portion 32a (see FIGS. 5(a), 5(b)). In the state in FIG. 5(a), the top surface of the support portion 32a comes into contact with the flange 31a, so that the component rack having the flange in question is maintained on the support portion 32a. In the state in FIG. 5(b), the support portion 32a retracts, so that the component rack can move in the vertical direction without being engaged with the support portion 32a.

Similarly to the movable mechanism 33a, the correction mechanisms 34a having the correction portions 35a are attached to be parallel in the lateral direction. Because the correction mechanisms 34a are coupled to the fixed end 37, motion such as a rotating movement and/or the like is not produced, the spacing between the correction portions 35a of a pair of the separation mechanisms 25 is fixed to fit the width of the component rack.

The operation of the separation mechanism will now be described with reference to FIG. 6 to FIG. 9.

Figure 6:
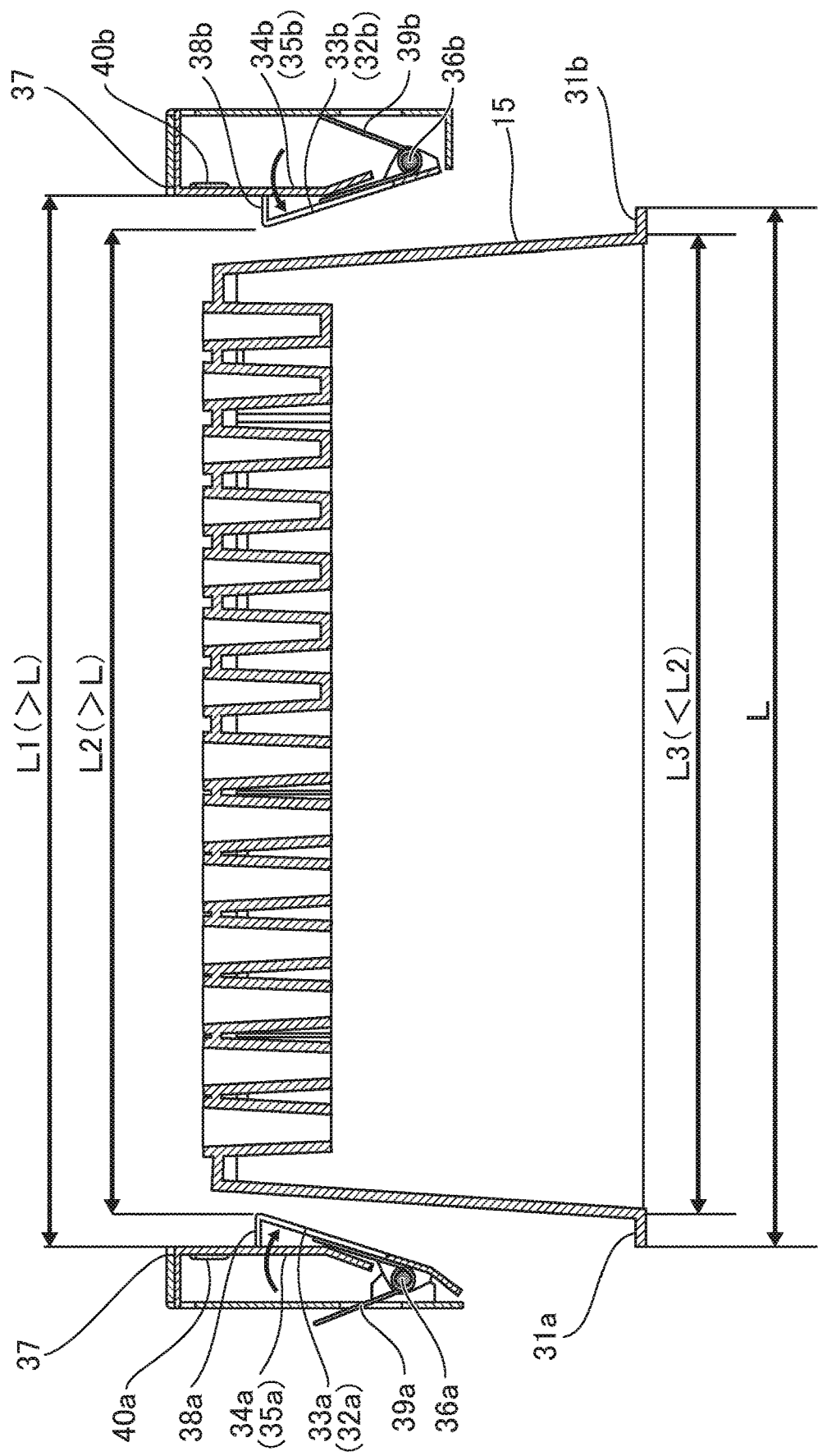
FIG. 6 is a sectional view illustrating the state of the component-rack separation mechanism section in which no component rack exists.

FIG. 6 illustrates the state in which any component rack does not exist in the component-rack separation mechanism section A. Because the upper ends of the support portions 32a, 32b abut on the stoppers 40a, 40b, a distance L2 between the leading ends of a pair of shelfs 38a, 38b is set to be shorter than a distance L between the leading ends of a pair of the flanges 31a, 31b of the component rack 15, and also the distance L2 is set to be longer than a distance L3 of the width of the component rack 15 except for the flanges 31a, 31b.

Further, a pair of the correction mechanisms 34a, 34b is coupled to the fixed ends 37, between which the distance is fixed at a certain distance L1 equal to or slightly longer than the width of the component rack. Specifically, in the state in which the upper ends of the support portions 32a, 32b abut on the stoppers 40a, 40b (the instance in FIG. 5(a) and FIG. 6), the correction mechanisms 34a, 34b are located at a certain distance from each other which is equal to the distance L1 between the upper ends of the shelfs 38a, 38b and longer than the distance L between the leading ends of the pair of the flanges 31a, 31b of the component rack 15.

Figure 7:
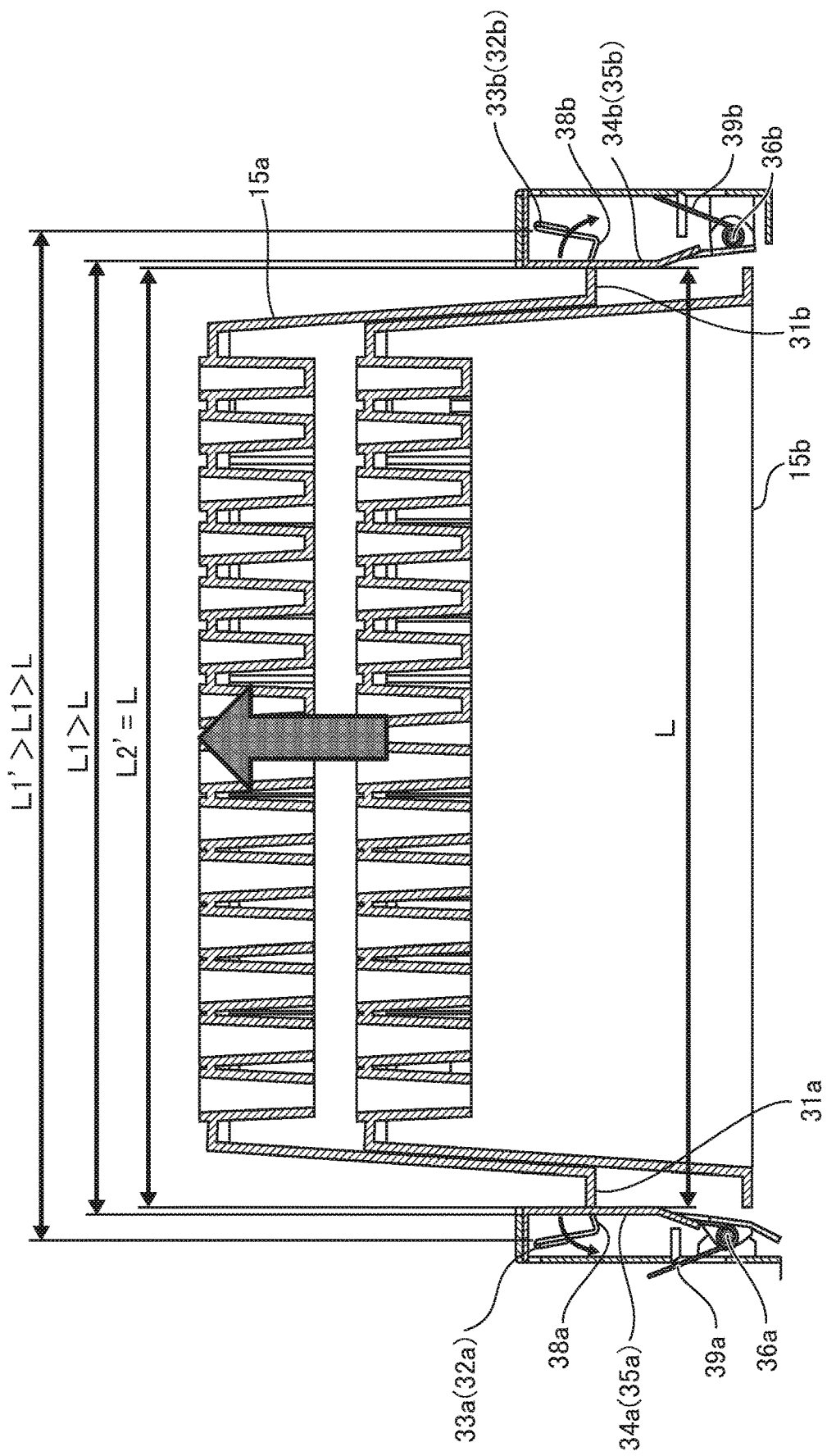
FIG. 7 is a sectional view illustrating a state of supplying the component racks to the component-rack separation mechanism section.

FIG. 7 illustrates the state in which the stacked component racks 15 holding the unused consumable items 29, 30 have been raised by the supply elevator platform 17. Incidentally, in the following, assume that a plurality of component racks is stacked, such as the component racks 15a, 15b, 15c, . . . arranged in the order from top. When the uppermost component rack 15a is raised to pass through between the pair of the shelves 32a, 32b, the flanges 31a, 31b abut on the side faces of the support portions 32a, 32b and push and rotate the movable units 33a, 33b. In other words, the force exerted by the supply elevator 19 to rise the component racks 15a acts to push the support portions 32a, 32b outward against the force of the elastic bodies 39a, 39b acting on the shelves to project them.

As a result, the support portions 32a, 32b is pushed to widen the spacing between them, so that the distance between the leading ends of the pair of the support portions 32a, 32b reaches a width L2' (=L) which is the same as that between the flanges 31a, 31b abutting on the support portions 32a, 32b. Further, because the shelves 38a, 38b rotate integrally with the support portions 32a, 32b about the rotational shafts 36a, 36b, a distance L1' between the upper ends of the shelves 38a, 38b reaches a longer distance L1'(>L1>L) than the distance L between the leading ends of the pair of the flanges 31a, 31b of the component rack 15 when any component rack does not exist in the component-rack separation mechanism section A (FIG. 6).

It is noted that, even if a positional deviation or distortion has occurred on the stacked component racks, the positional deviation or distortion can be corrected by the correction portions 35a, 35b coming into contact with the side faces of the flanges 31a, 31b. Accordingly, if a positional deviation occurs on the multiple component racks 15a stacked up, and therefore only one of the flanges of the component rack 15a comes into contact with the support portion 32a, 32b, this may make a pair of the movable mechanisms 33a, 33b unable to rotate uniformly, and, as a consequence of this, the uppermost component rack may possibly not be separated with reliability, the component rack may possibly fall, or/and the like. However, these things can be prevented.

Figure 8:
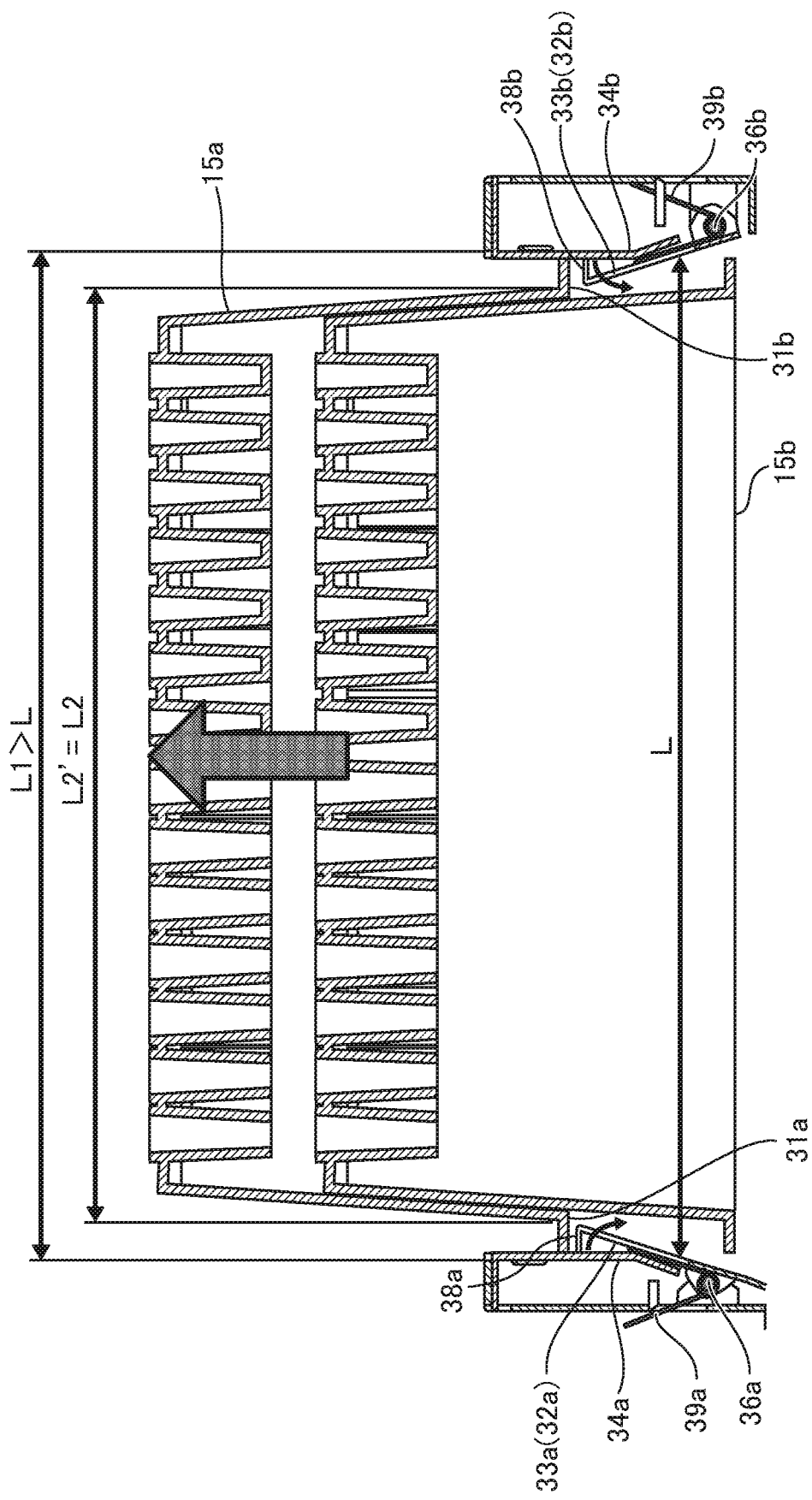
FIG. 8 is a sectional view illustrating a state before separation of the uppermost component rack.

FIG. 8 illustrates the state in which the supply elevator platform 17 is moved further upward and the flanges 31a, 31b of the uppermost component rack 15a has passed through the support portions 32a, 32b. By ceasing of the contact between the shelves and the flanges of the component rack 15a which open up the space between the support portions 32a, 32b, the shelves are pushed again by the elastic bodies 39a, 39b, so that the distance L2'(=L2<L) between the leading ends of the pair of the shelves 38a, 39b is reached.

In this case, the uppermost component rack 15a is held on the support portions 32, but the flanges of the second and subsequent component racks 15b in the order from top are out of contact with the support portions 32a, 32b. Therefore, the movable mechanisms 33a, 33b are maintained in the closing state. In this state, the presence of the correction mechanisms 34a, 34b also becomes important. Where the correction mechanisms 34a, 34b are not in existence, in the state in which the movable mechanisms 33a, 33b are maintained in the closing state and a positional deviation occurs on the stacked component racks, the flanges 31a, 31b of the component rack 15a may possibly come, at around the piece, into contact with positions above the support portions 32a, 32b, and the rotatable, movable mechanisms 33a, 33b may possibly push the downward-movement prevention members 32a, 32b to widen the space between them as an unintended state. Then, it is conjectured that, in subsequent operation, uniform contact with the component rack is not made impossible. For this reason, providing the correction mechanisms 34a, 34b contributes to a reduction in positional deviation because of abutting on the flanges 31a, 31b of the uppermost component rack 15, and to uniform contact between the support portions 32a, 32b and the component rack which is ensued.

FIG. 9 illustrates the state in which the supply elevator platform 17 is moved downward. In this state, because the distance L2 between the leading ends of the pair of the support portions 32a, 32b is shorter than the distance L between the leading ends of the flanges 31a, 31b of the component rack 15a (L2<L), the component rack 15a is not able to be moved downward as the supply elevator platform 17 is moved downward. On the other hand, the component racks 15b, 15c, . . . and the like which are located downward of the support portions 32a, 32b are moved downward by self-weight in accordance with the descent movement of the supply elevator platform 17. As a result, the uppermost component rack 15a reaches a state of its flanges 31a, 31b being placed on the shelves 38a, 38b, and also the positional deviation of the component rack 15 is minimized by the correction portions 35a, 35b, so that the uniform contact between the shelves 38a, 38b and the flanges 31a, 31b of the component rack can be achieved to prevent the uppermost component rack 15a from being moved downward. As a result, the stable separation between the uppermost component rack 15a and the other component racks 15b, 15c, . . . is achieved.

It is noted that, although the automatic analysis device has been described in the embodiment, in terms of using component racks and supplying consumable items prohibited from reuse, a consumable-item supply device mounted on an automatic specimen processing system can be achieved by similar configuration.

According to the present invention, even if a positional deviation is caused by stacking conditions of the multiple stacked component racks, the asymmetry between the separation mechanism and the component racks, and/or the like, only the component rack at the leading stage can be stably separated from the other component racks to be supplied to without being affected by the positional deviation. And therefore, contributions to stable analysis capability and operation performance are made possible.

Further, typically, because so-called consumable items on the component racks are supplied to an apparatus body by a human operator (user or the like), depending on how the component racks are stacked, position is variable in the stacked direction giving rise to a need to consider the risk of workload when component racks are stacked and supplied. However, in the present invention, because it is possible to minimize a positional deviation caused by stacking conditions of the multiple stacked component racks, the asymmetry between the separation mechanism and the component racks, and/or the like, this makes it possible to reduce the risk of workload of the user in the stacking and supplying process.

Further, the contents of the present invention is applicable to a structure to perform the operation of separation between the leading stage and the second stage of what being stacked without respect to the component racks, and the structure for containers and/or the like having one or more pair of engaging portions, such as flanges, holes or the like, used for the separation, and general versatility in installation to the automatic analysis device and the automatic specimen processing system may be involved.

LIST OF REFERENCE SIGNS

1 . . . Automatic analysis device
2 . . . Controller
3 . . . Specimen entrance unit
4 . . . Specimen transfer line
5 . . . Specimen storage unit
6 . . . Reaction disk
7 . . . Reagent disk
8 . . . Measurement unit
9 . . . Consumable-item supply device
10 . . . Component transporter
11 . . . Sample container
12 . . . Specimen rack
13 . . . Specimen sampling mechanism
14 . . . Reagent dispensing mechanism
15, 15a, 15b, 15c . . . Component rack
16 . . . Tip insertion position
17, 18 . . . Platform
19, 20 . . . Elevator
21 . . . Rack elevator room
22 . . . Mount
23 . . . Component disposal position
24 . . . Waste component collection box
25 . . . Separation mechanism
26 . . . Rack transfer device
27 . . . Rack positioning device
28 . . . Floor open/close device
29 . . . Nozzle tip
30 . . . Reaction container
31a, 31b . . . Flange
32a, 32b . . . Support portion
33a, 33b . . . Movable mechanism
34a, 34b . . . Correction mechanism
35a, 35b . . . Correction portion
36a, 36b . . . Rotational shaft
37 . . . Fixed end
38a, 38b . . . Shelf
39a, 39b . . . Elastic body
40a, 40b . . . Stopper
A . . . Component-rack separation mechanism section
B . . . Consumable-item retrieval mechanism section
S . . . Sample extraction position

The invention claimed is:

1. An automatic analysis device equipped with a consumable-item supply device to supply a consumable-item rack which has an upper side on which consumable items are held and has flanges provided in a lower place, comprising:
   a platform that is capable of holding a plurality of the consumable-item racks in a state in which the consumable-item racks are stacked;
   a driving unit that moves, in a vertical direction, the platform holding the consumable-item racks in a horizontal position;
   a controller programmed to control operation of the driving unit; and
   a pair of separation mechanisms that are placed to be spaced at a certain distance apart in a horizontal direction, the pair of separation mechanisms separating an uppermost consumable-item rack from the consumable-item racks which are stacked,
   wherein each one of the pair of separation mechanisms has a support portion, including a plurality of support portion sections, that is movable and abuts on the underside of one of the flanges to support a consumable rack, and a correction portion, including a plurality of correction portion sections, that is stationary and abuts on a side face of the flange to correct a position of the consumable-item rack, wherein the support portion sections and the correction portion sections are alternately arranged along a longitudinal axis of each of the separation mechanisms.

2. The automatic analysis device according to claim 1, wherein the controller moves the platform upward a first distance, and then moves the platform downward a second distance which is shorter than the first distance, such that the flanges of the uppermost consumable-item rack are positioned above the support portions and also the flanges of a consumable-item rack located directly below the uppermost consumable-item rack are positioned below the support portions.

3. The automatic analysis device according to claim 1, wherein
   the pair of separation mechanisms has elastic bodies urging the support portions toward the consumable-item rack.

4. The automatic analysis device according to claim 1, wherein the support portion and the correction portion are placed to be adjacent to each other.

5. The automatic analysis device according to claim 1, wherein each of the support portions is capable of moving between a first position in which the consumable-item rack is able to be supported, and a second position in which the consumable item is able to pass through between the support portions, and when the support portions are in the first position, a distance (L) between leading ends of the flanges is longer than a distance (L2) between the support portions and also is shorter than a distance (L1) between the holding portions.

6. The automatic analysis device according to claim 1, wherein each of the support portions is capable of moving between a first position in which the consumable-item rack is able to be supported, and a second position in which the consumable item is able to pass through between the support portions, and when the support portions are in the second position, a distance (L) between leading ends of the flanges is approximately equal to a distance (L2) between the support portions.

7. The automatic analysis device according to claim 1, wherein the consumable items are tips, containers or both.

* * * * *